(12) United States Patent
Xiao et al.

(10) Patent No.: US 12,095,120 B2
(45) Date of Patent: Sep. 17, 2024

(54) ELECTROLYTE INJECTION DEVICE

(71) Applicant: WUXI LEAD INTELLIGENT EQUIPMENT CO., LTD., Jiangsu (CN)

(72) Inventors: Jianglian Xiao, Wuxi (CN); Yizhou Sun, Wuxi (CN)

(73) Assignee: WUXI LEAD INTELLIGENT EQUIPMENT CO., LTD., Wuxi (CN)

( * ) Notice: Subject to any disclaimer, the term of this patent is extended or adjusted under 35 U.S.C. 154(b) by 119 days.

(21) Appl. No.: 18/147,173

(22) Filed: Dec. 28, 2022

(65) Prior Publication Data

US 2023/0163437 A1 May 25, 2023

Related U.S. Application Data

(63) Continuation of application No. PCT/CN2021/143939, filed on Dec. 31, 2021.

(30) Foreign Application Priority Data

Sep. 2, 2021 (CN) .......................... 202122113571.4

(51) Int. Cl.
*H01M 50/618* (2021.01)

(52) U.S. Cl.
CPC ........... *H01M 50/618* (2021.01); *Y02E 60/10* (2013.01)

(58) Field of Classification Search
CPC .............................. H01M 50/60; Y02E 60/10
USPC ......................................................... 141/59
See application file for complete search history.

(56) References Cited

U.S. PATENT DOCUMENTS

| 5,731,099 A  | * | 3/1998 | Badger | H01M 50/673 |
| | | | | 137/260 |
| 9,859,569 B2 | * | 1/2018 | Takada | H01M 50/636 |
| 2022/0247052 A1 | * | 8/2022 | Hirai | F04B 17/03 |

FOREIGN PATENT DOCUMENTS

| CN | 203277549 U | 11/2013 |
| CN | 203850373 U | 9/2014 |
| CN | 109065827 A | * 12/2018 .......... H01M 10/058 |
| CN | 208753428 U | 4/2019 |
| CN | 110350140 A | 10/2019 |
| CN | 111341996 A | 6/2020 |

(Continued)

OTHER PUBLICATIONS

KR 20070092382 A—English Translation (Year: 2007).*

(Continued)

*Primary Examiner* — Timothy L Maust
*Assistant Examiner* — Christopher M Afful
(74) *Attorney, Agent, or Firm* — Maier & Maier, PLLC

(57) ABSTRACT

An electrolyte injection device can include a support plate for carrying a battery, a first electrolyte injection cup, an air extraction assembly, a second electrolyte injection cup and an electrolyte injection assembly, where the first electrolyte injection cup is provided with a communication port communicating with an electrolyte injection port of the battery, and an electrolyte inlet and an air extraction port communicating with the communication port, an air extraction device communicates with the electrolyte injection port through the air extraction assembly, the air extraction port and the communication port, and the second electrolyte injection cup communicates with the electrolyte injection port through the electrolyte injection assembly, the electrolyte inlet and the communication port.

13 Claims, 3 Drawing Sheets

(56) References Cited

FOREIGN PATENT DOCUMENTS

| | | | | |
|---|---|---|---|---|
| JP | H1173942 | A | 3/1999 | |
| JP | 2002298833 | A | 10/2002 | |
| JP | 2005259444 | A | 9/2005 | |
| JP | 2008059973 | A | 3/2008 | |
| KR | 20070092382 | A * | 9/2007 | ............ H01M 10/42 |
| WO | 2023029331 | A1 | 3/2023 | |

OTHER PUBLICATIONS

CN 109065827 A—English Abstract (Year: 2018).*
Office Action issued on Jan. 9, 2024, in corresponding Japanese Application No. 2022-581711, 5 pages.
International Search Report issued on May 30, 2022, in corresponding International Application No. PCT/CN2021/143939, 5 pages.

* cited by examiner

ELECTROLYTE INJECTION DEVICE

RELATED APPLICATION

The application claims the priority of Chinese patent application No. 202122113571.4, filed on Sep. 2, 2021, titled "electrolyte injection device", the entire contents of which are hereby incorporated by reference.

TECHNICAL FILED

The application relates to the technical field of electrolyte injection equipment for battery preparation, in particular to an electrolyte injection device.

BACKGROUND

The inside of a battery case needs to be vacuumized before electrolyte injection. Traditional electrolyte injection equipment is provided with an electrolyte injection block, the electrolyte injection block is provided with an electrolyte injection channel, an air extraction channel and an outlet communicating with both the electrolyte injection channel and the air extraction channel, and the outlet is used for communicating with the inside of the battery case.

The electrolyte injection block needs to be used repeatedly. Since the electrolyte injection block only has one outlet, output ends of the electrolyte injection channel and the air extraction channel are connected to each other, and after air extraction, the inside of the air extraction channel and the inside of the battery case are both under negative pressure, an electrolyte input via the electrolyte injection channel enters the air extraction channel easily, which will affect the use of an air extraction device.

SUMMARY

In view of the problem that an electrolyte enters an air extraction channel of an electrolyte injection block easily, it is necessary to provide an electrolyte injection device which prevents an electrolyte from affecting an air extraction device.

To solve the above technical problems, the technical scheme adopted by this application is as follows. An electrolyte injection device comprises:

a support plate, bearing a battery;

a first electrolyte injection cup, connected to the support plate, and having a communication port communicating with an electrolyte injection port of the battery, and an electrolyte inlet and an air extraction port communicating with the communication port;

a second electrolyte injection cup, for storing an electrolyte and arranged above the first electrolyte injection cup;

an air extraction assembly having an air extraction channel with an end for communicating with an air extraction device; and an electrolyte injection assembly, connected to the air extraction assembly, arranged between the first electrolyte injection cup and the second electrolyte injection cup, and having an electrolyte injection channel, the electrolyte injection assembly and the second electrolyte injection cup being capable of moving close to and away from each other, and the second electrolyte injection cup communicating with an end of the electrolyte injection channel when the second electrolyte injection cup is close to and abuts against the electrolyte injection assembly;

wherein the air extraction assembly and the electrolyte injection assembly are capable of synchronously moving close to and away from the first electrolyte injection cup, and when the air extraction assembly and the electrolyte injection assembly are synchronously close to and abut against the first electrolyte injection cup, another end, away from the air extraction device, of the air extraction channel communicates with the air extraction port, and another end, away from the second electrolyte injection cup, of the electrolyte injection channel communicates with the electrolyte inlet.

By means of the above-mentioned electrolyte injection device, the battery is placed on the support plate first, then the air extraction assembly and the electrolyte injection assembly are moved close to and abut against the first electrolyte injection cup, and next the second electrolyte injection cup is made to abut against the electrolyte injection assembly, so that the air extraction device communicates with the electrolyte injection port of the battery through the air extraction channel, the air extraction port and the communication port, and the second electrolyte injection cup communicates with the electrolyte injection port of the battery through the electrolyte injection channel, the electrolyte inlet and the communication port. At the beginning, an electrolyte outlet of the second electrolyte injection cup is in a closed state, and the air extraction device operates to vacuumize the inside of the battery, the air extraction channel and the electrolyte injection channel. After vacuumizing, the air extraction device is closed, and then the electrolyte outlet of the second electrolyte injection cup is opened, so that the electrolyte in the second electrolyte injection cup flows into the battery through the electrolyte injection channel. As the air extraction device and the second electrolyte injection cup communicate with the battery on the support plate through the air extraction assembly and the electrolyte injection assembly respectively, and the air extraction assembly and the electrolyte injection assembly are separated from the first electrolyte injection cup, the second electrolyte injection cup and the air extraction device, the electrolyte can be effectively prevented from entering the air extraction device and will not affect the use of the air extraction device.

In one embodiment, the first electrolyte injection cup further comprises a transit chamber communicating with the communication port, the electrolyte inlet and the air extraction port, and the communication port is provided in a bottom wall of the transit chamber; and the electrolyte injection device further comprises a stop block connected to the first electrolyte injection cup and located in the transit chamber, a diversion channel is formed by enclosing of the stop block and a top wall or side wall of the transit chamber, the diversion channel communicates with the air extraction port, and an opening of the diversion channel faces the side wall or top wall of the transit chamber.

In one embodiment, the electrolyte injection device further comprises a first mating part and a second mating part, the first mating part is connected to the support plate, the second mating part is connected to the first electrolyte injection cup, and the first mating part and the second mating part are connected detachably.

In one embodiment, the electrolyte injection device further comprises a bearing plate which is detachably connected to the support plate, and the first electrolyte injection cup is mounted on the bearing plate.

In one embodiment, the air extraction assembly comprises an air extraction nozzle and an air extraction joint connected to each other, a channel inside the air extraction nozzle communicates with a channel inside the air extraction joint to form the air extraction channel, the air extraction joint is for communicating with the air extraction device, and when the air extraction assembly is close to and abuts against the first electrolyte injection cup, the air extraction nozzle communicates with the air extraction port.

In one embodiment, the electrolyte injection assembly comprises an electrolyte injection nozzle and an electrolyte injection joint connected to each other, a channel inside the electrolyte injection nozzle communicates with a channel inside the electrolyte injection joint to form the electrolyte injection channel, when the electrolyte injection assembly is close to and abuts against the first electrolyte injection cup, the electrolyte injection nozzle communicates with the electrolyte inlet, and when the second electrolyte injection cup is close to and abuts against the electrolyte injection assembly, the second electrolyte injection cup communicates with the electrolyte injection joint.

In one embodiment, the electrolyte injection device further comprises a driving assembly;
the air extraction assembly is arranged above the first electrolyte injection cup, and the driving assembly is in driving connection with the support plate to drive the support plate and the first electrolyte injection cup to move upward and downward to be close to and away from the air extraction assembly and the electrolyte injection assembly;
or, the driving assembly is in driving connection with the air extraction assembly and the electrolyte injection assembly to drive the air extraction assembly and the electrolyte injection assembly to be close to and away from the first electrolyte injection cup.

In one embodiment, the electrolyte injection device further comprises an elastic assembly, the driving assembly is in driving connection with the elastic assembly, both the air extraction assembly and the electrolyte injection assembly are connected to the elastic assembly, and when the air extraction assembly and the electrolyte injection assembly are close to and abut against the first electrolyte injection cup, the elastic assembly is for providing an elastic force to keep the air extraction assembly and the electrolyte injection assembly away from the first electrolyte injection cup.

In one embodiment, the air extraction assembly is arranged above the first electrolyte injection cup, the elastic assembly comprises a fixed piece, a guide piece and an elastic piece, the driving assembly is in driving connection with the fixed piece, the guide piece is connected to the fixed piece in a reciprocating manner in a vertical direction, the elastic piece is connected between the fixed piece and the guide piece, and both the air extraction assembly and the electrolyte injection assembly are connected to the guide piece.

In one embodiment, the support plate is for bearing a plurality of batteries, and the electrolyte injection device comprises a plurality of first electrolyte injection cups, a plurality of groups of air extraction assemblies, a plurality of second electrolyte injection cups and a plurality of groups of the electrolyte injection assemblies;
the communication port of each first electrolyte injection cup is for communicating with the electrolyte injection port of the corresponding battery;
an end of each of the air extraction channels communicates with the air extraction device, an end, away from the air extraction device, of the air extraction channel of any air extraction assembly abutting against the first electrolyte injection cup communicates with the corresponding air extraction port, and an end of the electrolyte injection channel of any electrolyte injection assembly abutting against the first electrolyte injection cup communicates with the electrolyte inlet; and
each of the second electrolyte injection cups is capable of abutting against the corresponding electrolyte injection assembly.

DETAILED DESCRIPTION OF THE EMBODIMENTS

The application provides an electrolyte injection device. In order to make the purpose, technical scheme and effect of the application clearer and more definite, the application will be further explained in detail with reference to the attached drawings and embodiments. It should be understood that the specific embodiments described here are only used to explain the application, but are not used to limit the application.

Figure 1:
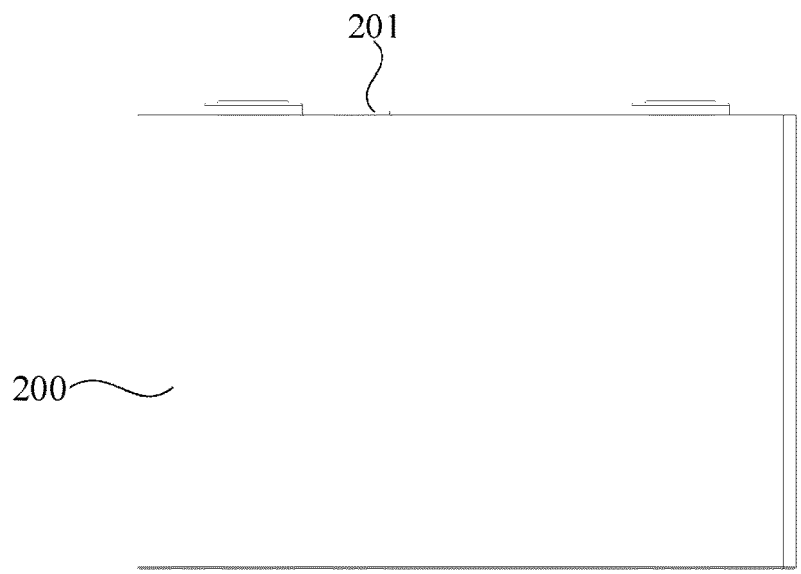
FIG. 1 is a structural diagram of a conventional battery.
Figure 2:
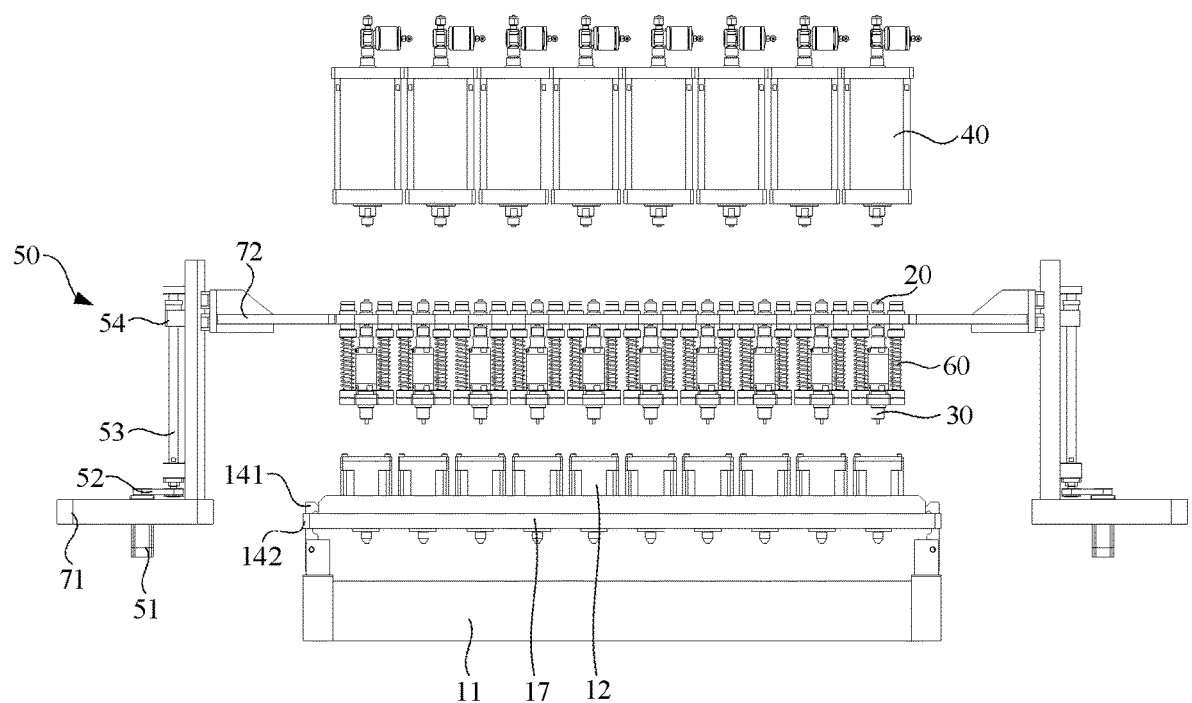
FIG. 2 is a structural diagram of an electrolyte injection device provided in an embodiment of the application.
Figure 3:
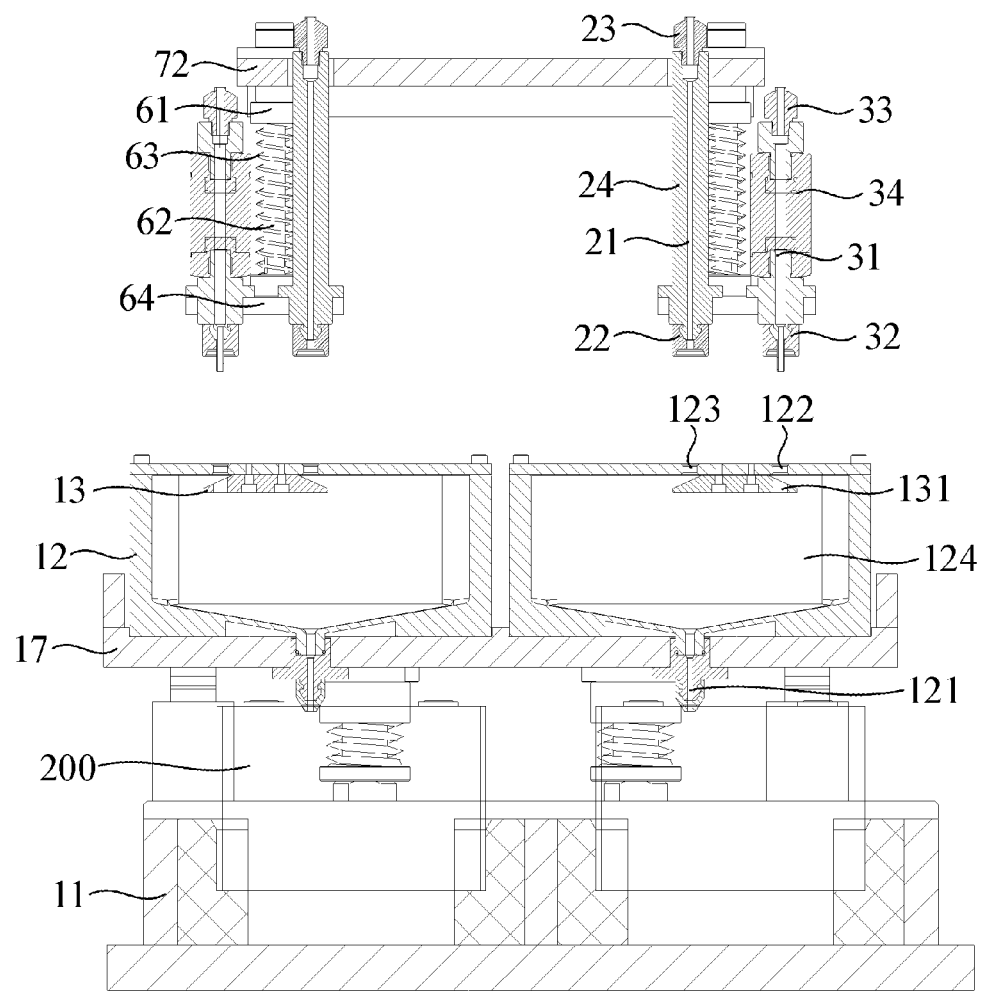
FIG. 3 is a diagram of the matching relationship between a bearing assembly of the electrolyte injection device shown in FIG. 2 and mechanisms such as an air extraction assembly and an electrolyte injection assembly.
Figure 4:
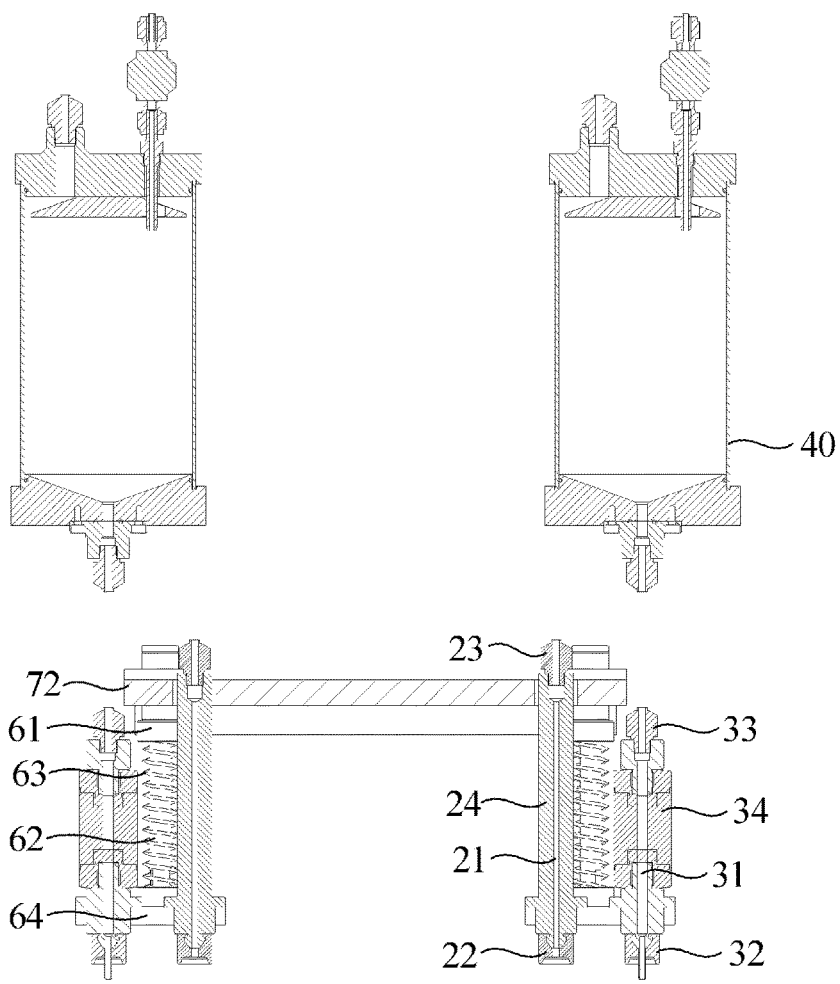
FIG. 4 is a diagram of the matching relationship between an electrolyte injection cup of the electrolyte injection device shown in FIG. 2 and mechanisms such as an air extraction assembly and an electrolyte injection assembly.

As shown in FIGS. 2-4, an electrolyte injection device provided in an embodiment of the application is used for vacuumizing the inside of a battery 200 through an electrolyte injection port 201 of the battery 200 and injecting an electrolyte into the battery 200. The electrolyte injection device comprises a support plate 11, a first electrolyte injection cup 12, an air extraction assembly 20, an electrolyte injection assembly 30 and a second electrolyte injection cup 40.

The support plate 11 is used for supporting the battery 200. The first electrolyte injection cup 12 is connected to the support plate 11, and the first electrolyte injection cup 12 is provided with a communication port 121 communicating with the electrolyte injection port 201 of the battery 200, and an electrolyte inlet 122 and an air extraction port 123 communicating with the communication port 121. The second electrolyte injection cups 40 are arranged above the first electrolyte injection cups 12 and used for storing an electrolyte.

The air extraction assembly 20 is provided with an air extraction channel 21 with an end used for communicating with the air extraction device, and the electrolyte injection assembly 30 is connected to the air extraction assembly 20 and arranged between the first electrolyte injection cup 12 and the second electrolyte injection cup 40 to move close to and away from the first electrolyte injection cup 12 synchronously with the air extraction assembly 20. The electrolyte injection assembly 30 is provided with an electrolyte injection channel 31.

When the air extraction assembly 20 and the electrolyte injection assembly 30 synchronously are close to and abut against the first electrolyte injection cup 12, another end, away from the air extraction device, of the air extraction channel 21 communicates with the air extraction port 123, and an end of the electrolyte injection channel 31 communicates with the electrolyte inlet 122.

The electrolyte injection assembly 30 and the second electrolyte injection cup 40 can move close to and away from each other. When the electrolyte injection assembly 30 is close to and abuts against the first electrolyte injection cup 12, an end of the electrolyte injection channel 31 communicates with the electrolyte inlet 122. And when the second electrolyte injection cup 40 is close to and abuts against the electrolyte injection assembly 30, the second electrolyte injection cup 40 communicates with another end, away from the electrolyte inlet 122, of the electrolyte injection channel 31.

By means of the above-mentioned electrolyte injection device, the battery 200 is placed on the support plate 11 firstly, then the air extraction assembly 20 and the electrolyte injection assembly 30 are moved close to and abut against the first electrolyte injection cup 12, and next the second electrolyte injection cup 40 is made to abut against the electrolyte injection assembly 30, so that the air extraction device communicates with the electrolyte injection port 201 of the battery 200 through the air extraction channel 21, the air extraction port 123 and the communication port 121, and the second electrolyte injection cup 40 communicates with the electrolyte injection port 201 of the battery 200 through the electrolyte injection channel 31, the electrolyte inlet 122 and the communication port 121. At the beginning, an electrolyte outlet of the second electrolyte injection cup 40 is in a closed state, and the air extraction device operates to vacuumize the inside of the battery 200, the air extraction channel 21 and the electrolyte injection channel 31. After vacuumizing, the air extraction device is closed, and then the electrolyte outlet of the second electrolyte injection cup 40 is opened, so that the electrolyte in the second electrolyte injection cup 40 flows into the battery 200 through the electrolyte injection channel 31. As the air extraction device and the second electrolyte injection cup 40 communicate with the battery 200 on the support plate 11 through the air extraction assembly 20 and the electrolyte injection assembly 30 respectively, and the air extraction assembly 20 and the electrolyte injection assembly 30 are separated from the first electrolyte injection cup 12, the second electrolyte injection cup 40 and the air extraction device, the electrolyte can be effectively prevented from entering the air extraction device and will not affect the use of the air extraction device.

It should be noted that any two of the electrolyte injection assembly 30, the second electrolyte injection cup 40 and the first electrolyte injection cup 12 can move close to and away from each other in the vertical direction, that is, the electrolyte injection assembly 30 and the second electrolyte injection cup 40 can move close to and away from each other, the electrolyte injection assembly 30 and the first electrolyte injection cup 12 can move close to and away from each other, and the first electrolyte injection cup 12 and the second electrolyte injection cup 40 can move close to and away from each other. The electrolyte injection assembly 30 is located between the first electrolyte injection cup 12 and the second electrolyte injection cup 40, so both the first electrolyte injection cup 12 and the second electrolyte injection cup 40 abut against the electrolyte injection assembly 30.

It can be understood that the electrolyte injection assembly 30, the second electrolyte injection cup 40 and the first electrolyte injection cup 12 can all move upward and downward, or when one of the electrolyte injection assembly 30, the second electrolyte injection cup 40 and the first electrolyte injection cup 12 is fixed, the other two of which can move upward and downward.

Figure 5:
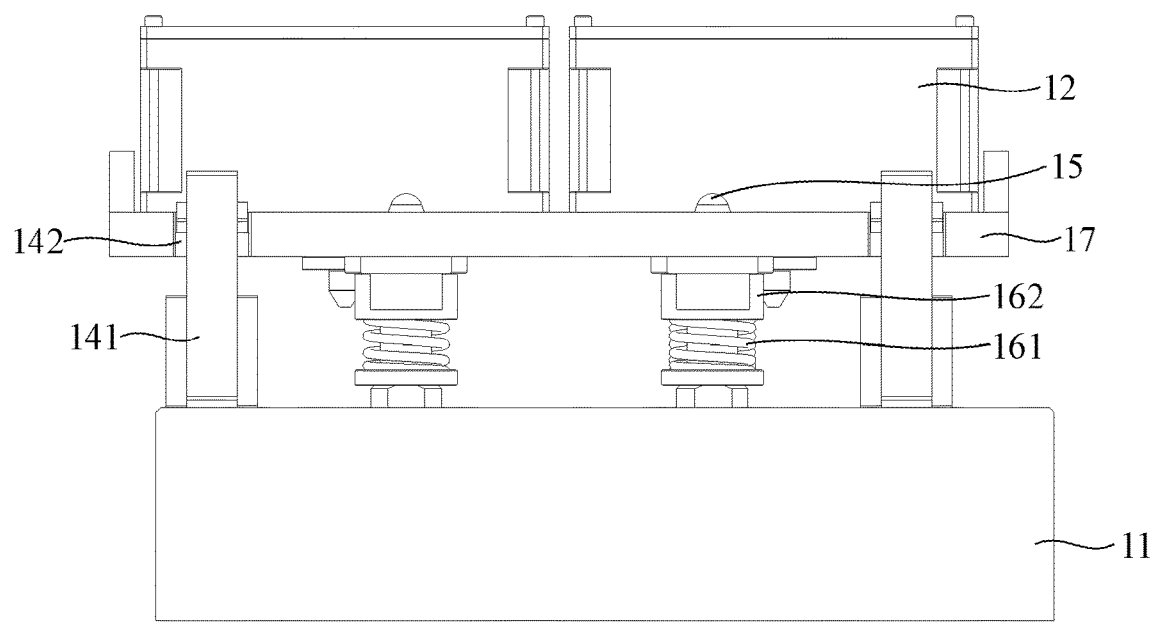
FIG. 5 is a structural diagram of a bearing assembly of the electrolyte injection device shown in FIG. 2.

Referring to FIGS. 2, 3 and 5, in some embodiments, a bracket is formed on the support plate 11, and the bracket is used for bearing the battery 200 and positioning the battery 200 to prevent the battery 200 from shaking during electrolyte injection.

In some embodiments, the first electrolyte injection cup 12 further has a transit chamber 124, the communication port 121, the electrolyte inlet 122 and the air extraction port 123 all communicate with the transit chamber 124, and the communication port 121 is provided in a bottom wall of the transit chamber 124. In this way, during vacuumizing and electrolyte injection, both gas and the electrolyte will pass through the transit chamber 124 and be buffered by the transit chamber 124, so that the electrolyte can be prevented from entering the air extraction port 123.

In addition, it should be noted that the first electrolyte injection cup 12 is separated from the air extraction assembly 20, the electrolyte injection assembly 30 and the second electrolyte injection cup 40. Therefore, after electrolyte injection of the battery 200 on the support plate 11, some of the electrolyte in the transit chamber 124 may not flow into the battery 200. At this point, the support plate 11 and the first electrolyte injection cup 12 can be moved away from the bottom of the electrolyte injection assembly 30 and allowed to stand for a period of time, so that the electrolyte can completely enter the battery 200 and the internal pressure and external pressure of the battery 200 can be equal.

Further, the electrolyte inlet 122 and the air extraction port 123 are both provided in a top wall of the transit chamber 124 to communicate with the electrolyte injection assembly 30 and the air extraction assembly 20 located above the first electrolyte injection cup 12.

In practice, the bottom wall of the transit chamber 124 is funnel-shaped, and the communication port 121 is located at the lowest position of the bottom wall of the transit chamber 124, so as to prevent the electrolyte from accumulating on the bottom wall of the transit chamber 124.

Specifically, the side wall and the bottom wall of the transit chamber 124 are connected by an arc surface to avoid the accumulation of the electrolyte.

In some embodiments, the electrolyte injection device further comprises a stop block 13 connected to the first electrolyte injection cup 12 and located in the transit chamber 124, a diversion channel is formed by enclosing of the stop block 13 and the top wall or side wall of the transit chamber 124, the diversion channel communicates with the air extraction port 123, and an opening of the diversion channel faces the side wall or top wall of the transit chamber 124 to prevent the electrolyte dripping on the bottom wall of the transit chamber 124 from splashing into the air extraction port 123.

It can be understood that the function of the stop block 13 is to prevent the air extraction port 123 from directly facing the bottom wall of the transit chamber 124, so as to prevent the electrolyte dripping on the bottom wall from splashing into the air extraction port 123.

In addition, it should be noted that when the stop block 13 is connected to the side wall of the transit chamber 124, the opening of the diversion channel faces upwards, and the splashing electrolyte can enter the diversion channel from the opening of the diversion channel. In order to prevent the splashing electrolyte from accumulating in the diversion channel, a bottom of the diversion channel is provided with a drain hole for discharging the accumulated electrolyte.

Further, the stop block 13 is connected to the top wall of the transit chamber 124 and located between the air extraction port 123 and the electrolyte inlet 122. The stop block 13 has an inclined surface, the diversion channel is formed by enclosing of the inclined surface and the top wall, and both the air extraction port 123 and the electrolyte inlet 122 communicate with the diversion channel.

In practice, the stop block 13 is provided with a through hole 131 which runs through stop block 13 in the vertical direction, and the through hole 131 corresponds to the electrolyte inlet 122, so as to facilitate electrolyte injection and prevent the electrolyte from hitting the inclined surface of the stop block 13 and splashing in the transit chamber 124.

In some embodiments, the electrolyte injection device further comprises a first mating part 141 and a second mating part 142, the first mating part 141 is connected to the support plate 11, the second mating part 142 is connected to the first electrolyte injection cup 12, and the first mating part 141 and the second mating part 142 are detachably connected, so that the first electrolyte injection cup 12 and the support plate 11 are locked and fixed.

In practice, the first mating part 141 is a clamping jaw rotatably connected to the support plate 11, and the second mating part 142 is located on a clamping block fixedly connected to the first electrolyte injection cup 12. After the first electrolyte injection cup 12 is connected to the support plate 11, the clamping jaw is rotated to be clamped with the clamping block, so that the first electrolyte injection cup 12 and the support plate 11 are locked and fixed.

It can be understood that the first mating part 141 and the second mating part 142 can also be mated in other ways, such as an electromagnet and a metal block, a clamping block and a groove, and a clamping jaw and a lug, etc., which is not limited here, as long as the first electrolyte injection cup 12 and the support plate 11 can be locked and fixed.

In some embodiments, the electrolyte injection device further comprises a positioning member 15, which is arranged on the support plate 11, and the first electrolyte injection cup 12 is provided with a positioning hole. When the first electrolyte injection cup 12 is mounted on the support plate 11, the positioning member 15 penetrates through the positioning hole to ensure that the first electrolyte injection cup 12 is accurately mounted on the support plate 11, thereby ensuring that the communication port 121 of the first electrolyte injection cup 12 communicates with the electrolyte injection port 201 of the battery 200 when the first electrolyte injection cup 12 is mounted on the support plate 11.

In practice, the positioning member 15 is a positioning pin. Of course, in other embodiments, the positioning pin can also be arranged on the first electrolyte injection cup 12, and the support plate 11 is correspondingly provided with a positioning hole.

In some embodiments, the electrolyte injection device further comprises a support assembly, which is arranged on the support plate 11 and used for supporting the first electrolyte injection cup 12 when the first electrolyte injection cup 12 is mounted on the support plate 11.

Further, the support assembly comprises a first support member 161 and a second support member 162, an end of the first support member 161 is connected to the support plate 11, and the second support member 162 is fixedly connected to another end, away from the support plate 11, of the first support member 161. The first support member 161 provides an elastic force to push the first support member 161 away from the support plate 11, and the second support member 162 is used to abut against the first electrolyte injection cup 12 when the first electrolyte injection cup 12 is mounted on the support plate 11.

In this way, when the first electrolyte injection cup 12 and the support plate 11 need to be connected, the positioning hole in the first electrolyte injection cup 12 passes through the positioning member 15 on the support plate 11, and then the first electrolyte injection cup 12 is pressed down against the elastic force of the first support member 161 until the first mating part 141 and the second mating part 142 can be connected together, so as to lock the first electrolyte injection cup 12 with the support plate 11. To separate the first electrolyte injection cup 12 from the support plate 11, the first mating part 141 and the second mating part 142 are separated first, so that the first electrolyte injection cup 12 will bounce up under the action of the first support member 161 and the second support member 162, and then the first electrolyte injection cup 12 can be detached.

In practice, the first support member 161 is a spring, and the second support member 162 is a movable block. Both the spring and the movable block are disposed around the positioning pin, which extends in the vertical direction and can also guide the movement of the spring and the movable block.

Referring to FIGS. 3 and 4, in some embodiments, the air extraction assembly 20 comprises an air extraction nozzle 22 and an air extraction joint 23 which are connected to each other, a channel inside the air extraction nozzle 22 communicates with a channel inside the air extraction joint 23 to form the air extraction channel 21, the air extraction joint 23 is used for communicating with the air extraction device, and when the air extraction assembly 20 is close to and abuts against the first electrolyte injection cup 12, the air extraction nozzle 22 communicates with the air extraction port 123.

Further, the air extraction assembly 20 further comprises an air extraction block 24 with a first communication channel, the air extraction nozzle 22 and the air extraction joint 23 are respectively connected to two opposite ends of the air extraction block 24, and the channel inside the air extraction nozzle 22 and the channel inside the air extraction joint 23 respectively communicate with two opposite ends of the first communication channel of the air extraction block 24, so that the channel inside the air extraction nozzle 22, the first communication channel and the channel inside the air extraction joint 23 all communicate to form the air extraction channel 21.

In some embodiments, the electrolyte injection assembly 30 comprises an electrolyte injection nozzle 32 and an electrolyte injection joint 33 which are connected to each other, a channel inside the electrolyte injection nozzle 32 communicates with a channel inside the electrolyte injection joint 33 to form the electrolyte injection channel 31, when the electrolyte injection assembly 30 is close to and abuts against the first electrolyte injection cup 12, the electrolyte injection nozzle 32 communicates with the electrolyte inlet 122, and when the second electrolyte injection cup 40 is close to and abuts against the electrolyte injection assembly 30, the second electrolyte injection cup 40 communicates with the electrolyte injection joint 33.

Further, the electrolyte injection assembly 30 comprises an electrolyte injection block 34 with a second communication channel, the electrolyte injection nozzle 32 and the electrolyte injection joint 33 are connected to two opposite ends of the electrolyte injection block 34 respectively, and the channel inside the electrolyte injection nozzle 32 and the channel inside the electrolyte injection joint 33 respectively communicate with two opposite ends of the second communication channel of the electrolyte injection block 34, so that the channel inside the electrolyte injection nozzle 32, the second communication channel and the channel inside the electrolyte injection joint 33 communicate with one another to form the electrolyte injection channel 31.

It should be noted that both the air extraction nozzle 22 and the electrolyte injection nozzle 32 abut against the first electrolyte injection cup 12, and when the air extraction nozzle 22 and the electrolyte injection nozzle 32 abut against the first electrolyte injection cup 12, the air extraction nozzle 22 and the electrolyte injection nozzle 32 are sealed from the first electrolyte injection cup 12 to avoid gas and electrolyte leakage.

In some embodiments, the electrolyte injection nozzle 32 has an abutting part and a tip connected to each other, the channel inside the electrolyte injection nozzle 32 passes through the abutting part and the tip, the abutting part is used for abutting against the first electrolyte injection cup 12 to ensure the tightness, and the tip is used for passing through the electrolyte inlet 122 and extending into the transit chamber 124 to directly input the electrolyte into the transit chamber 124.

Referring to FIG. 2, in some embodiments, the electrolyte injection device further comprises a driving assembly 50 which is in driving connection with the air extraction assembly 20 and the electrolyte injection assembly 30 to drive the air extraction assembly 20 and the electrolyte injection assembly 30 to move close to and away from the support plate 11 and the first electrolyte injection cup 12.

It should be noted that when the support plate 11 is fixed under the electrolyte injection assembly 30, the second electrolyte injection cup 40 can also move upward and downward, and the second electrolyte injection cup 40 can be driven to move upward and downward by the driving assembly 50, or a driving mechanism can be additionally arranged to drive the second electrolyte injection cup 40 to move upward and downward, which is not limited here.

It should be further noted that the support plate 11 being fixed under the electrolyte injection assembly 30 means that the battery 200 on the support plate 11 is fixed under the electrolyte injection assembly 30 when vacuumizing and electrolyte injection are required. After electrolyte injection, the support plate 11 and the first electrolyte injection cup 12 can be moved away from under the electrolyte injection assembly 30. That is, the electrolyte injection device has a frame, on which the electrolyte injection assembly 30 and the second electrolyte injection cup 40 are arranged and can move upward and downward. The frame has an installation position under the electrolyte injection assembly 30, and the support plate 11 is detachably mounted at the installation position.

In other embodiments, the driving assembly 50 is in driving connection with the support plate 11 to drive the support plate 11 and the first electrolyte injection cup 12 to move upward and downward, so as to be close to and away from the air extraction assembly 20 and the electrolyte injection assembly 30. Therefore, the air extraction assembly 20 is arranged above the support plate 11 in this embodiment.

It should be noted that the driving assemblies 50 in the two embodiments may be identical in structure. In the following description, it is assumed that the driving assembly 50 is in driving connection with the air extraction assembly 20 and the electrolyte injection assembly 30, and the air extraction assembly 20 is located above the support plate 11.

In some embodiments, the driving assembly 50 comprises a driving member 51 and a transmission unit, and the driving member 51 drives the air extraction assembly 20 and the electrolyte injection assembly 30 to move upward and downward through the transmission unit. Of course, the air extraction assembly 20 and the electrolyte injection assembly 30 may also be driven by separate driving members 51, so that the air extraction assembly 20 can move horizontally and the electrolyte injection assembly 30 can move vertically.

In practice, the driving member 51 is a motor, and the transmission unit comprises a transmission belt 52, a screw 53 and a transmission nut 54. The transmission belt 52 is connected to the driving member 51 and the screw 53, and the transmission nut 54 is in screw-thread fit with the screw 53, and is fixedly connected to the air extraction assembly 20 and the electrolyte injection assembly 30.

Referring to FIGS. 2 and 3, in some embodiments, the electrolyte injection device further comprises an elastic assembly 60, the driving assembly 50 is in driving connection with the elastic assembly 60, both the air extraction assembly 20 and the electrolyte injection assembly 30 are connected to the elastic assembly 60, and when the air extraction assembly 20 and the electrolyte injection assembly 30 are close to and abut against the first electrolyte injection cup 12, the elastic assembly 60 is used for providing an elastic force to keep the air extraction assembly 20 and the electrolyte injection assembly 30 away from the first electrolyte injection cup 12.

The elastic assembly 60 can provide the elastic force to keep the air extraction assembly 20 and the electrolyte injection assembly 30 away from the support plate 11, which means that when the air extraction assembly 20 and the electrolyte injection assembly 30 abut against the first electrolyte injection cup 12, the air extraction assembly 20 and the electrolyte injection assembly 30 are not in rigid contact with the first electrolyte injection cup 12, thus preventing one or more of the air extraction assembly 20, the electrolyte injection assembly 30 and the first electrolyte injection cup 12 from being damaged.

Further, the elastic assembly 60 comprises a fixed piece 61, a guide piece 62 and an elastic piece 63, the driving assembly 50 is in driving connection with the fixed piece 61, the guide piece 62 is connected to the fixed piece 61 in a reciprocating manner in a vertical direction, the elastic piece 63 is connected between the fixed piece 61 and the guide piece 62, and both the air extraction assembly 20 and the electrolyte injection assembly 30 are connected to the guide piece 62.

In practice, the elastic assembly 60 further comprises a connecting block 64 which is fixedly connected to an end of the guide piece 62, the elastic piece 63 is connected between the fixed piece 61 and the connecting block 64, and the air extraction assembly 20 and the electrolyte injection assembly 30 are both fixedly connected to the connecting block 64.

Specifically, the fixed piece 61 is a linear bearing, the guide piece 62 is a vertically extending guide column, and the elastic piece 63 is a spring which is disposed around the guide column.

In some embodiments, the electrolyte injection device comprises a mounting frame 71 and a mounting plate 72, the driving assembly 50 is mounted on the mounting frame 71, the mounting plate 72 is connected to the mounting frame 71 and can move upward and downward, and both the air extraction assembly 20 and the electrolyte injection assembly 30 are connected to the mounting plate 72.

Further, the elastic assembly 60 is connected to the mounting plate 72, and the air extraction assembly 20 and the electrolyte injection assembly 30 are connected to the elastic assembly 60.

In some embodiments, the support plate 11 is used for bearing a plurality of batteries 200, the electrolyte injection device comprises a plurality of first electrolyte injection cups 12, and the communication port 121 of each first electrolyte injection cup 12 is used for communicating with the electrolyte injection port 201 of a corresponding battery.

Further, the electrolyte injection device comprises a plurality of groups of air extraction assemblies 20 and a plurality of groups of electrolyte injection assemblies 30, an end of each air extraction channel 21 communicates with the air extraction device, an end, away from the air extraction device, of the air extraction channel 21 of any air extraction assembly 20 abutting against the first electrolyte injection cup 12 communicates with the corresponding air extraction port 123, and an end of the electrolyte injection channel 31 of any electrolyte injection assembly 30 abutting against the first electrolyte injection cup 12 communicates with the electrolyte inlet 122.

In practice, the electrolyte injection device further comprises a plurality of second electrolyte injection cups 40, each second electrolyte injection cup 40 can abut against a corresponding electrolyte injection assembly 30, so that the second electrolyte injection cup 40 communicates with the electrolyte injection channel 31 of the corresponding electrolyte injection assembly 30, and thus the second electrolyte injection cup 40 communicates with the electrolyte injection port 201 of the corresponding battery 200.

In some embodiments, the electrolyte injection device further comprises a bearing plate 17, the support plate 11 is provided with a plurality of brackets, and a plurality of first electrolyte injection cups 12 are mounted on the bearing plate 17 which is detachably connected to the support plate 11. When the bearing plate 17 is connected to the support plate 11, the plurality of first electrolyte injection cups 12 are in one-to-one correspondence with the batteries 200 in the plurality of brackets, that is, the communication port 121 of each first electrolyte injection cup 12 communicates with the electrolyte injection port 201 of a corresponding battery 200.

In addition, it can be understood that the first mating part 141 is connected to the support plate 11, the second mating part 142 is connected to the bearing plate 17, and the positioning hole is provided in the bearing plate 17.

Further, the bearing plate 17 is provided with a connecting hole for the first electrolyte injection cup 12 to pass through, and a bottom of the first electrolyte injection cup 12 passes through the connecting hole, so that the communication port 121 in the bottom of the first electrolyte injection cup 12 communicates with the electrolyte injection port 201 in the battery 200.

In some embodiments, a plurality of groups of air extraction assemblies 20 and a plurality of groups of electrolyte injection assemblies 30 are mounted on the mounting plate 72 to move upward and downward synchronously with the mounting plate 72, thereby simultaneously vacuumizing and injecting the electrolyte into a plurality of batteries 200.

Further, a plurality of groups of elastic assemblies 60 are provided and all connected to the mounting plate 72, and each group of air extraction assemblies 20 and each group of electrolyte injection assemblies 30 are connected to a corresponding group or two groups of elastic assemblies 60.

In practice, the driving member 51 is mounted on the mounting frame 71, the screw 53 is rotatably connected to the mounting frame 71 around a vertical axis, the driving nut 54 is fixedly connected to the mounting plate 72, fixed blocks of each group of elastic assemblies 60 are fixedly connected to the mounting plate 72, and each group of air extraction assemblies 20 and each group of electrolyte injection assemblies 30 are fixedly connected to a corresponding connecting block 64.

In some embodiments, two mounting frames 71 are provided and arranged in the horizontal direction in a spaced manner, the support plate 11 is positioned between the two mounting frames 71, and two opposite ends of the mounting plate 72 are respectively slidably arranged on the two mounting frames 71.

Further, two groups of driving assemblies 50 are provided, which are respectively mounted on the two mounting frames 71 and are in driving connection with the opposite ends of the mounting plate 72 respectively to drive the mounting plate 72 to move upward and downward stably.

It may be understood that for those of ordinary skill in the art, equivalent substitutions or changes may be made according to the technical solution and inventive concept of the application, and all these changes or substitutions should belong to the protection scope of the appended claims of the application.

What is claimed is:

1. An electrolyte injection device, comprising:
   a support plate for bearing a battery;
   a first electrolyte injection cup, connected to the support plate, and having a communication port communicating with an electrolyte injection port of the battery, and an electrolyte inlet and an air extraction port communicating with the communication port;
   a second electrolyte injection cup for storing an electrolyte and arranged above the first electrolyte injection cup;
   an air extraction assembly having an air extraction channel with an end for communicating with an air extraction device; and
   an electrolyte injection assembly connected to the air extraction assembly, arranged between the first electrolyte injection cup and the second electrolyte injection cup, and having an electrolyte injection channel, the electrolyte injection assembly and the second electrolyte injection cup configured to move close to and away from each other, and the second electrolyte injection cup communicating with an end of the electrolyte injection channel when the second electrolyte injection cup is close to and abuts against the electrolyte injection assembly;
   wherein the air extraction assembly and the electrolyte injection assembly are configured to synchronously move close to and away from the first electrolyte injection cup, and when the air extraction assembly and the electrolyte injection assembly are synchronously close to and abut against the first electrolyte injection cup, another end, away from the air extraction device, of the air extraction channel communicates with the air extraction port, and another end, away from the second electrolyte injection cup, of the electrolyte injection channel communicates with the electrolyte inlet.

2. The electrolyte injection device of claim 1, wherein the first electrolyte injection cup further comprises a transit chamber communicating with the communication port, the electrolyte inlet and the air extraction port, and the communication port is provided in a bottom wall of the transit chamber; and the electrolyte injection device further comprises a stop block connected to the first electrolyte injection cup and located in the transit chamber, a diversion channel is formed by enclosing of the stop block and a top wall or side wall of the transit chamber, the diversion channel communicates with the air extraction port, and an opening of the diversion channel faces the side wall or top wall of the transit chamber.

3. The electrolyte injection device of claim 2, further comprising a first mating part and a second mating part, the first mating part connected to the support plate, the second mating part connected to the first electrolyte injection cup, and the first mating part and the second mating part connected detachably.

4. The electrolyte injection device of claim 1, further comprising a bearing plate detachably connected to the support plate, and the first electrolyte injection cup mounted on the bearing plate.

5. The electrolyte injection device of claim 1, wherein the air extraction assembly comprises an air extraction nozzle and an air extraction joint connected to each other, a channel inside the air extraction nozzle communicates with a channel inside the air extraction joint to form the air extraction channel, the air extraction joint is for communicating with the air extraction device, and when the air extraction assembly is close to and abuts against the first electrolyte injection cup, the air extraction nozzle communicates with the air extraction port.

6. The electrolyte injection device of claim 1, wherein the electrolyte injection assembly comprises an electrolyte injection nozzle and an electrolyte injection joint connected to each other, a channel inside the electrolyte injection nozzle communicates with a channel inside the electrolyte injection joint to form the electrolyte injection channel, when the electrolyte injection assembly is close to and abuts against the first electrolyte injection cup, the electrolyte injection nozzle communicates with the electrolyte inlet, and when the second electrolyte injection cup is close to and abuts against the electrolyte injection assembly, the second electrolyte injection cup communicates with the electrolyte injection joint.

7. The electrolyte injection device of claim 1, further comprising a driving assembly;

the air extraction assembly arranged above the first electrolyte injection cup, and the driving assembly in driving connection with the support plate to drive the support plate and the first electrolyte injection cup to move upward and downward to be close to and away from the air extraction assembly and the electrolyte injection assembly.

8. The electrolyte injection device of claim 7, further comprising an elastic assembly, the driving assembly in driving connection with the elastic assembly, both the air extraction assembly and the electrolyte injection assembly connected to the elastic assembly, and when the air extraction assembly and the electrolyte injection assembly are close to and abut against the first electrolyte injection cup, the elastic assembly for providing an elastic force to keep the air extraction assembly and the electrolyte injection assembly away from the first electrolyte injection cup.

9. The electrolyte injection device of claim 8, wherein the air extraction assembly is arranged above the first electrolyte injection cup, the elastic assembly comprises a fixed piece, a guide piece and an elastic piece, the driving assembly is in driving connection with the fixed piece, the guide piece is connected to the fixed piece in a reciprocating manner in a vertical direction, the elastic piece is connected between the fixed piece and the guide piece, and both the air extraction assembly and the electrolyte injection assembly are connected to the guide piece.

10. The electrolyte injection device of claim 1, wherein the support plate is for bearing a plurality of batteries, and the electrolyte injection device comprises a plurality of the first electrolyte injection cups, a plurality of groups of the air extraction assemblies, a plurality of the second electrolyte injection cups and a plurality of groups of the electrolyte injection assemblies;

the communication port of each of the first electrolyte injection cups is for communicating with the electrolyte injection port of the corresponding battery;

an end of each of the air extraction channels communicates with the air extraction device, an end, away from the air extraction device, of the air extraction channel of any air extraction assembly abutting against the first electrolyte injection cup communicates with the corresponding air extraction port, and an end of the electrolyte injection channel of any electrolyte injection assembly abutting against the first electrolyte injection cup communicates with the electrolyte inlet; and each of the second electrolyte injection cups is configured to abut against the corresponding electrolyte injection assembly.

11. The electrolyte injection device of claim 1, further comprising a driving assembly;

the driving assembly in driving connection with the air extraction assembly and the electrolyte injection assembly to drive the air extraction assembly and the electrolyte injection assembly to be close to and away from the first electrolyte injection cup.

12. The electrolyte injection device of claim 11, further comprising an elastic assembly, the driving assembly in driving connection with the elastic assembly, both the air extraction assembly and the electrolyte injection assembly being connected to the elastic assembly, and when the air extraction assembly and the electrolyte injection assembly are close to and abut against the first electrolyte injection cup, the elastic assembly being for providing an elastic force to keep the air extraction assembly and the electrolyte injection assembly away from the first electrolyte injection cup.

13. The electrolyte injection device of claim 12, wherein the air extraction assembly is arranged above the first electrolyte injection cup, the elastic assembly comprises a fixed piece, a guide piece and an elastic piece, the driving assembly is in driving connection with the fixed piece, the guide piece is connected to the fixed piece in a reciprocating manner in a vertical direction, the elastic piece is connected between the fixed piece and the guide piece, and both the air extraction assembly and the electrolyte injection assembly are connected to the guide piece.

* * * * *